United States Patent

Hughes et al.

[11] Patent Number: 6,055,282
[45] Date of Patent: Apr. 25, 2000

[54] DIGITALLY SAMPLED PHASE QUANTIZED FM DETECTOR FOR A COMMUNICATION RECEIVER

[75] Inventors: James David Hughes, Boynton Beach, Fla.; Gwilym Francis Luff, Cambridge, United Kingdom

[73] Assignee: Motorola, Schaumburg, Ill.

[21] Appl. No.: 09/055,431

[22] Filed: Apr. 6, 1998

[51] Int. Cl.[7] .................................................. H03D 1/00
[52] U.S. Cl. ........................................... 375/340; 375/325
[58] Field of Search ..................................... 375/320, 324, 375/329, 331, 334, 335, 340, 342, 245, 261, 269, 272, 275, 279, 281, 286, 224, 226, 325, 350, 332; 329/300, 304, 315; 332/117

[56] References Cited

U.S. PATENT DOCUMENTS

| | | |
|---|---|---|
| 4,707,666 | 11/1987 | Pfeifer et al. . |
| 5,453,915 | 9/1995 | Lee . |
| 5,469,112 | 11/1995 | Lee . |
| 5,602,879 | 2/1997 | Wada ........................................ 375/355 |
| 5,633,895 | 5/1997 | Powell, II . |
| 5,661,759 | 8/1997 | Tulai . |

*Primary Examiner*—Chi H. Pham
*Assistant Examiner*—Jean B. Corrielus
*Attorney, Agent, or Firm*—James A. Lamb

[57] ABSTRACT

A digital phase quantized frequency modulation (FM) detector (300) is for a communication receiver (100). A digital phase FM quantizer receives (310) I and Q signals (221, 222) derived from a received FM signal (119) and generates a coded position word (381) of width M bits at the beginning of each period of a sample clock (190) that identifies a sector location of a phasor representing the I and Q signals. A two's complement converter (400) converts the coded position word into a two's complement position word of width M bits. A differentiator (420) of width M bits generates a two's complement difference word which represents a change of a phase angle of the phasor in magnitude and direction during each period of the sample clock. A digital post detection filter filters consecutive two's complement difference words and generates therefrom a reconstructed digital demodulated signal (461).

17 Claims, 7 Drawing Sheets

FIG. 7

DIGITALLY SAMPLED PHASE QUANTIZED FM DETECTOR FOR A COMMUNICATION RECEIVER

FIELD OF THE INVENTION

The present invention relates to a communication receiver and more particularly to a digital phase quantized frequency modulation (FM) detector.

BACKGROUND OF THE INVENTION

In paging and personal communication systems, radio carrier modulation techniques have evolved to use more complicated digital modulation methods, such as multi-level FM, in order to provide more sophisticated operational functions within limited bandwidth resources. Meanwhile, the design of demodulation circuits has evolved to demodulate these more complex modulations, while at the same time improving operational characteristics of the portable radios receiving the complex modulation. Some of the most important operational characteristics are signaling sensitivity, power drain, and cost. Analog demodulation techniques involving analog to digital circuits, peak and valley detectors, and threshold calculating circuitry have been used but suffer from large die area (which relates directly to cost, and typically also to power drain), and suffer from phase and amplitude distortion. In some new receiver designs used in portable radios, demodulation techniques that are a mixture of analog circuits, digital logic circuits, and a microprocessor circuit have been used to improve these characteristics. An example of such newer techniques is taught in U.S. Pat. No. 5,453,715, "Communication Device with Efficient Multi-level Digital Demodulator," issued on Sep. 26, 1995, which teaches a method of measuring time differences between zero crossings and measuring a direction of the zero crossings to accomplish demodulation of a multilevel frequency modulated signal. This technique relies on the conversion of a radio signal received at a carrier frequency to in-phase (I) and quadrature (Q) baseband signals that are manipulated by a small amount of front end analog circuitry that includes signal summing circuits and signal limiter circuits. The signal limiter circuits convert analog signals from the summing circuits to binary signals. The binary signals are then processed by a microprocessor to determine a time difference between successive zero crossings and a direction of a phase angle change of the analog signal at the zero crossings.

Another example of such newer techniques is taught in U.S. Pat. No. 5,633,895, "Communication Device with Synchronized Zero-Crossing Demodulator and Method," issued on May 27, 1997. This technique also relies on the conversion of a received signal at a carrier frequency to I and Q signals that are manipulated by a small amount of front end analog circuitry that includes signal summing circuits and signal limiter circuits. The signal limiter circuits convert analog signals from the summing circuits to binary signals. The binary signals are then processed by a microprocessor to determine a time difference between successive zero crossings and a direction of a phase angle change of the analog signal at the zero crossings. The microprocessor then uses the time differences between zero crossings and directions at zero crossings to generate a symbol clock synchronization signal to synchronize logic circuitry that is used to convert the binary signals into a symbol estimate.

While both of these techniques accomplish a sufficiently reliable demodulation of the received signal, they rely substantially on a microprocessor for determining the received symbol from the time between zero crossings and the phase angle direction at the zero crossings. The use of a microprocessor for this purpose requires significant program storage space and a continuous, significant portion of the available processing cycles whenever the radio is attempting to receive message. The use of the processing cycles typically results in additional power consumption.

Thus what is needed is a demodulation technique that efficiently accomplishes demodulation of multilevel digital FM signals, with less reliance on microprocessor resources.

DETAILED DESCRIPTION OF THE DRAWINGS

Figure 1:
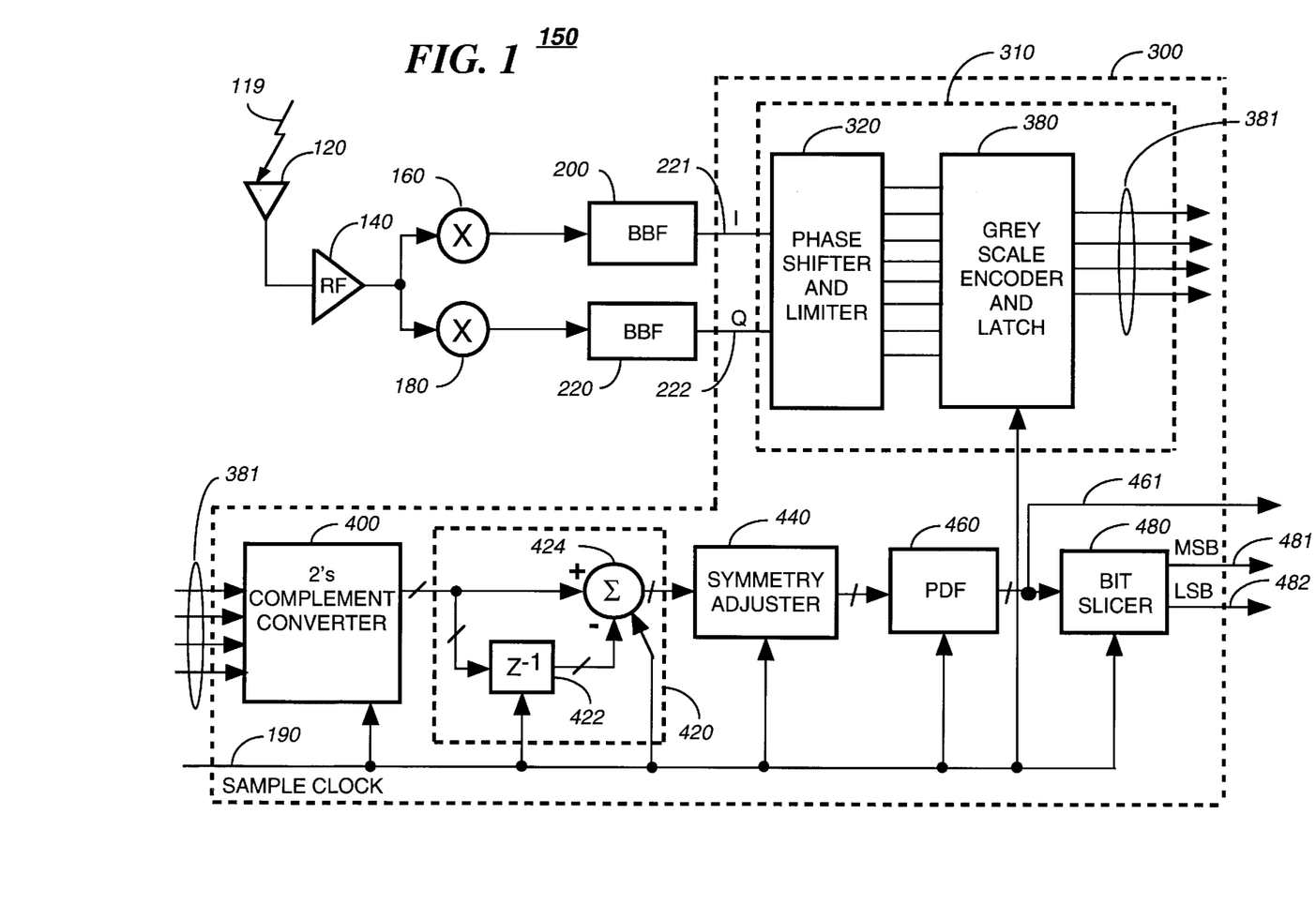
FIG. 1 is an electrical block diagram of a receiver section of a communication receiver utilizing a digital phase quantized frequency modulation (FM) detector. in accordance with the preferred embodiment of the present invention.
Figure 2:
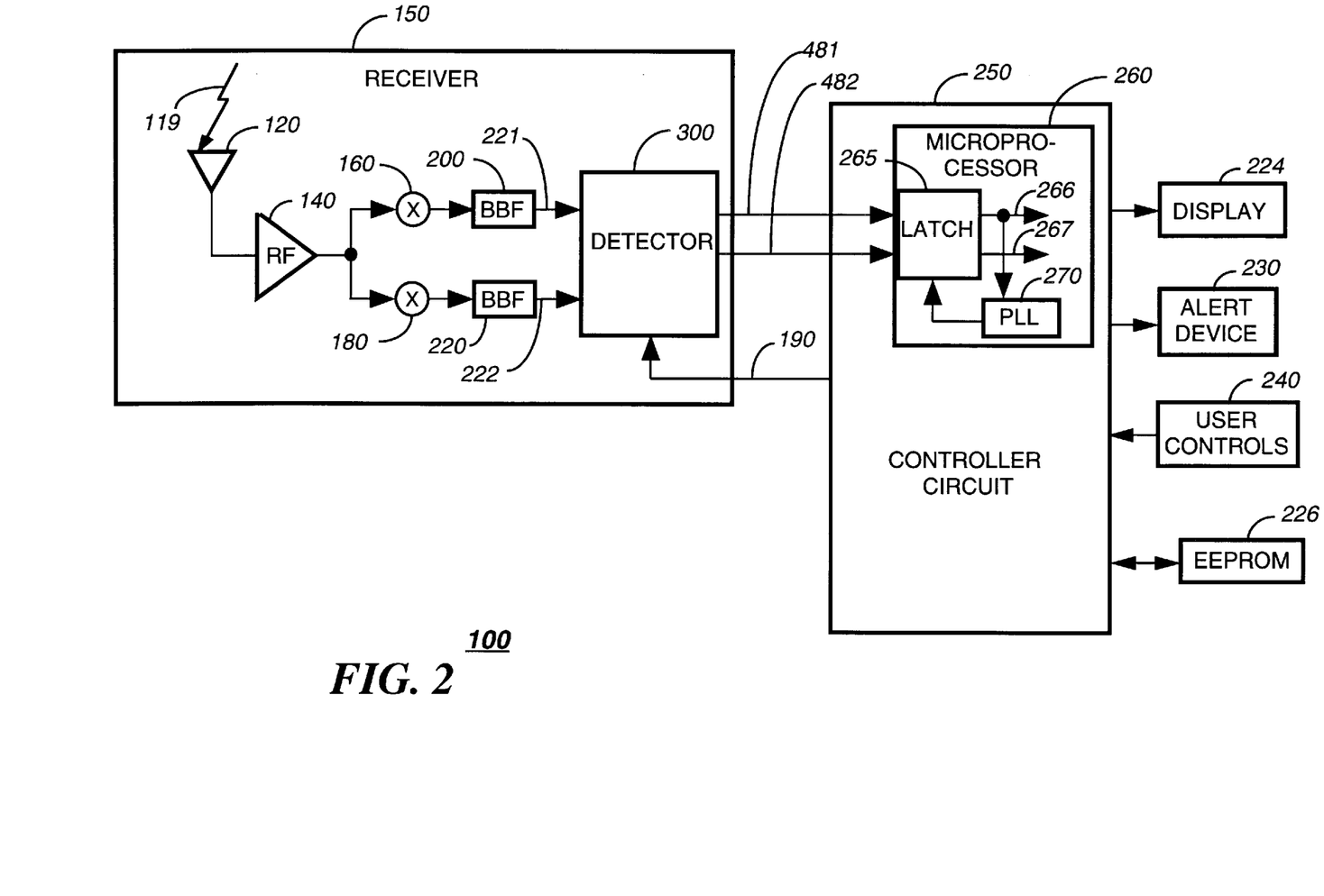
FIG. 2 is an electrical block diagram of the communication receiver, in accordance with the preferred embodiment of the present invention.

With reference first to FIGS. 1 and 2, the present invention relates to a communication receiver 100 and more particularly to a digital phase quantized frequency modulation (FM) detector or demodulator 300, which is also referred to hereinafter as the detector 300. In contrast to the demodulation techniques taught in U.S. Pat. No. 5,453,715, "Communication Device with Efficient Multi-level Digital Demodulator," issued on Sep. 26, 1995, and U.S. Pat. No. 5,633,895, "Communication Device with Synchronized Zero-Crossing Demodulator and Method," issued on May 27, 1997, the present invention uses a sample clock running asynchronously with respect to the recovered clock of the received data symbols. The sample clock typically runs at a higher rate than the highest deviation frequency used to modulate the FM carrier signal. "Front end" circuits are used in the present invention that are similar to those described in U.S. Pat. Nos. 5,453,715 and 5,633,895. In both the present invention and the receivers described in the above referenced patents, the I & Q signals are derived by conventional techniques from the received RF signal, and analog signal summing and signal limiter circuits. However, the present invention uses the outputs of the front end circuits differently, to locate an angular position of a phasor that represents I & Q signals to one of a plurality, N, of (N is preferably 16) sector locations at each sample clock period, instead of determining zero crossings and zero crossing times. Each sector location is identified as a binary word. A simple two's complement modulo N digital differentiator determines how many sectors are traversed during each clock period, as a binary word. The values of sectors traversed in each period, which are a sequence of binary values, are digitally filtered and integrated in a simple digital filter and integrator, resulting in a sequence of binary words at the sample clock rate that represent the demodulated signal. Thus, the present invention differs substantially from those of U.S. Pat. Nos. 5,453,715 and 5,633,895.

Referring to FIG. 1, a receiver section 150 of the communication receiver 100 (FIG. 2) is shown, in accordance with the preferred embodiment of the present invention. The receiver section 150 is a zero-intermediate frequency ("ZIF") receiver. The communication receiver 100 is an example of a receiver circuit for which the detector 300 of the present invention has utility. The receiver section 150 comprises an antenna 120 which detects a transmitted radio frequency (RF) signal 119 that has been frequency modulated. An RF amplifier 140 is connected to the antenna 120 to amplify the RF signal detected by the antenna 120. A pair of mixers 160 and 180 are coupled to the RF amplifier 140 and generate quadrature signals which are baseband filtered by baseband filters (BBF'S) 200, 220, respectively. The output of the BBF's 200, 220 are baseband I and Q signals 221, 222, respectively, which are therefore described herein as being derived from the received FM RF signal. The I and Q signals 221, 222, which are time varying, can be represented as a phasor which has a magnitude determined by the square root of the sum of the squares of the magnitudes of I and Q at each instant of time, and which has a phase angle that is determined by the arctangent of the ratio of the magnitudes of Q and I at each instant of time, as is well known to one of ordinary skill in the art. It will be appreciated that the present invention is equally beneficial when used in receivers using other conversion methods, such superheterodyne receivers that generate one or more intermediate frequencies before mixing one of them to the baseband I and Q signals.

The first major component of the detector 300 is a digital phase quantizer 310, which transforms the I and Q signals 221, 222 into a sequence of M bit wide, phase quantized, clocked Grey coded position words 381, each one of which identifies one of the plurality, N, of sectors (non-overlapping phase angle ranges that equally divide 360 degrees). N is related to M, by $N=2^M$. An identified sector is the sector within which the phase angle of the phasor representing the I and Q signals 221, 222 lies, reduced modulo 360 degrees (i.e., phase angles greater than 360 degrees are modulo reduced to within 360 degrees), and is also referred to as a sector location. The digital phase quantizer 310 comprises a phase shifter and limiter 320 and a Grey scale encoder and latch 380. The digital phase quantizer 310 generates an output comprising a sequence of the clocked Grey coded position words 381 that are generated at the beginning of each period of a sample clock 190. In accordance with the preferred embodiment of the present invention, M is 4, N is 16.

A two's (2's) complement converter 400 is coupled to the output of the digital phase quantizer 310 in order to receive the clocked Grey coded position word 381 and convert the clocked Grey code position word 381 to one of N two's complement position words, each of which is M bits wide and associates a sign bit and a 3 bit ordered integer with each of the clocked Grey coded position words 381 generated by the digital phase quantizer 310 at the beginning of each period of the sample clock 190. Consecutive ordered integers (interpreted two's complement modulo N/2, wherein the most negative $2^{M-1}$ integer is adjacent to the most positive $2^{M-1}$ integer) of the two's complement position word identify adjacent sectors. A differentiator 420 of binary width M is coupled to the output of the two's complement converter 400 to generate two's complement difference words of binary width M, each of which measures the number of sector locations traversed by the phasor of the I and Q signals 221, 222 during one sample clock period, and therefore represents a change of phase angle of the phasor during one sample clock period. The two's complement difference words measure the traversed sectors in both magnitude and direction, using a sign bit and magnitude bits. A symmetry adjuster circuit 440 is coupled to the output of the differentiator 420 for translating a particular value, −8, of the two's complement number into another value, 0, which is preferable because the two's complement code is not symmetric about zero for any value of N.

A finite impulse response (FIR) digital post detection filter (PDF) 460 is coupled to the output of the symmetry adjuster circuit 440 and generates a digitized demodulated signal 461 at the rate of the sample clock. The digitized signal demodulated signal 461 is also coupled to bit slicer 480, which, in accordance with the preferred embodiment of the present invention, generates an asynchronous most significant bit (MSB) 481 and an asynchronous least significant bit (LSB) 482 at the rate of the sample clock, by comparing the digitized value of the digitized demodulated signal 461 to predetermined ranges. The asynchronous MSB 481 and asynchronous LSB 482 are asynchronous with reference to a recovered symbol clock. The asynchronous MSB 481 and asynchronous LSB 482 when taken together are indicative of which of the four FM levels of modulation the level of the digitized demodulated signal is closest to at each sample clock period. The output of the receiver section 150 and detector 300 comprises the digitized demodulated signal 461 as well as the asynchronous MSB 481 and asynchronous LSB 482, which are coupled to a microprocessor 260 (FIG. 2). It will be appreciated that the present invention is capable of demodulating FM signals having more than or less than four levels of FM modulation, in which event the output of the bit slicer will have more bits or less bits than the two (MSB 481 and LSB 482) described for the preferred embodiment of the present invention.

Referring to FIG. 2, a block diagram of a the communication receiver 100 is shown, in accordance with the preferred embodiment of the present invention. The communication receiver 100 is a selective call radio that comprise the receiver section 150 and a controller circuit 250. The controller circuit 250 is coupled to a display 224, an alert 230, a set of user controls 240, and an electrically erasable read only memory (EEPROM) 226. The controller circuit 250 comprises a microprocessor 260. The asynchronous MSB 481 and asynchronous LSB 482 are coupled to an input latch 265 of the microprocessor 260. The microprocessor 260 uses the asynchronous MSB signal 481 in a conventional manner to synchronize a phase lock loop function 270 running at the symbol rate of the FM modulation of the FM signal 119 being received. The output of the phase lock loop function 270 generates a centered symbol clock signal that is used to latch the asynchronous MSB and LSB signals 481, 482 at an optimum time during each symbol that is being received, thereby recovering two bits per symbol 266, 267 that represent a demodulated digital signal. The controller circuit 250 also generates the sample clock 190, at a rate of 38,400 Hertz (Hz), in accordance with the preferred embodiment of the present invention. It will be appreciated that the latch 265 and phase lock loop function 270 could alternatively be performed by conventional digital logic circuits instead of within the microprocessor 260. This could be more efficient when only one symbol rate is to be recovered. It will be appreciated that sample clock rates other than 38,400 Hz can be used and in fact will be preferable for communication receivers 100 which are designed to recover other combinations of symbol clock rates. In accordance with the preferred embodiment of the present invention, the sample clock rate is four times the value of a maximum deviation frequency of the symbols to be recovered (9600 Hz). This is a preferable ratio of the sample clock to the maximum deviation frequency of the symbols to be recovered, and provides a sufficiently accurate, non-ambiguous measurement of the change of phase angle of the phasor to provide a highly reliable recovery of the received data symbols under noisy signal conditions. It will be appreciated that a higher ratio would provide an equally or slightly more reliable recovery of the data symbols, but cause more power drain, while a lower ratio would significantly reduce the reliability of data symbol recovery caused by ambiguous determinations of the direction of phase angle changes.

The microprocessor 260 is coupled to the EEPROM 226 for storing an embedded address stored therein during a maintenance operation and for loading the embedded address during normal operations of the communication receiver 100. The microprocessor 260 is a conventional microprocessor comprising a central processing unit (CPU), a read only memory (ROM), and a random access memory (RAM).

A message processor function of the microprocessor 260 decodes outbound words and processes an outbound message when an address received in the address field of the outbound signaling protocol matches the embedded address stored in the EEPROM 226, in a manner well known to one of ordinary skill in the art for a selective call radio. An outbound message that has been determined to be for the communication receiver 100 by the address matching is processed by the message processor function according to the contents of the outbound message and according to modes set by manipulation of the set of user controls 240, in a conventional manner. An alert signal is typically generated when an outbound message includes user information. The alert signal is coupled to the alert device 230, which is typically either an audible or a silent alerting device.

When the outbound message includes alphanumeric or graphic information, the information is displayed on the display 224 in a conventional manner by a display function at a time determined by manipulation of the set of user controls 240.

Figure 3:
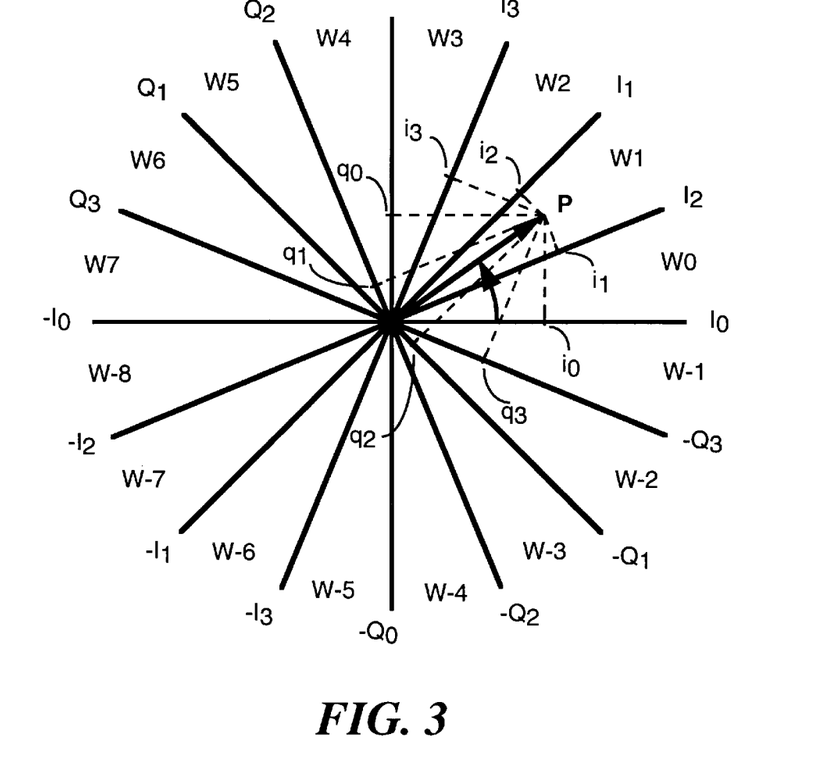
FIG. 3 is a phasor diagram illustrating a determination of a sector location of a phasor, in accordance with the preferred embodiment of the present invention.
Figure 4:
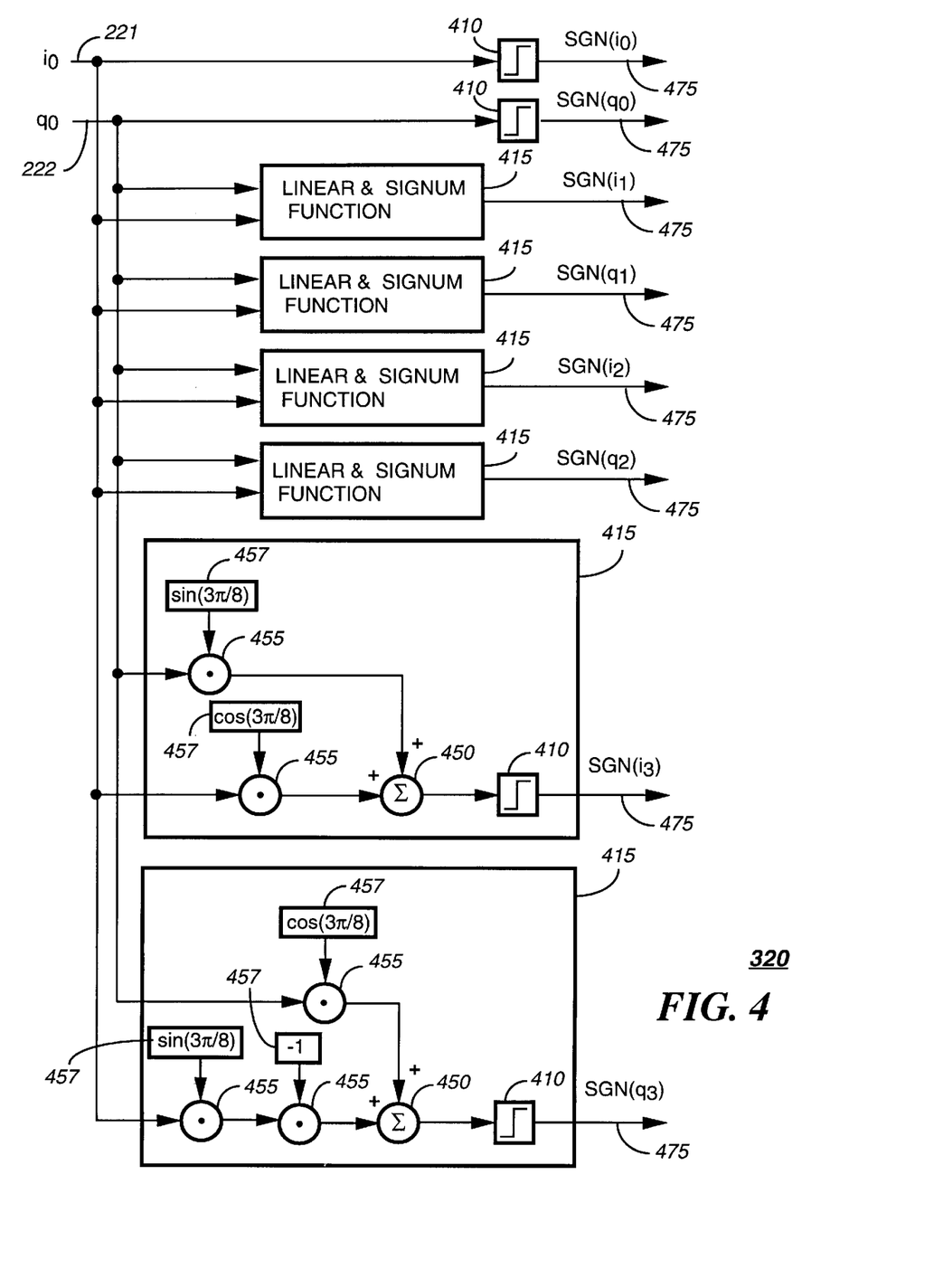
FIG. 4 is an electrical schematic diagram of a phase shifter and limiter of the digital phase quantized FM detector, in accordance with the preferred embodiment of the present invention.
Figure 5:
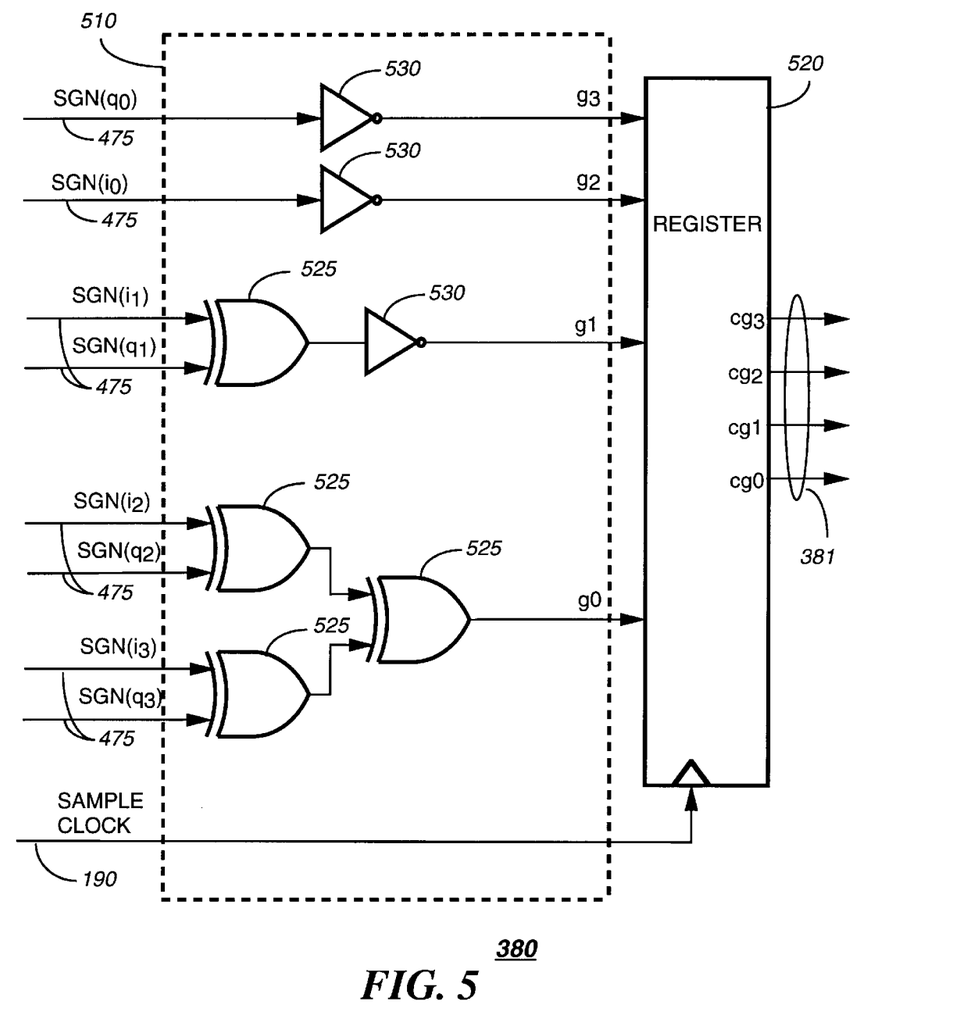
FIG. 5 is an electrical schematic diagram of a Grey encoder of the digital phase quantized FM detector, in accordance with the preferred embodiment of the present invention.

With reference to FIGS. 3–5, the digital phase quantizer 310 will now be described in greater detail. FIG. 3 is a phasor diagram that illustrates a determination of a sector location of a phasor by the phase shifter and limiter 320, in accordance with the preferred embodiment of the present invention. The phase shifter and limiter 320 is essentially a position word generator which generates an $2^M/2$ bit wide binary position word to represent a current position of the FM vector (or signal phasor, P) within one of the N equal sectors in a complex plane. In accordance with the preferred embodiment of the present invention, M is 4 and N is 16. As shown in FIG. 3, the complex plane is divided into 16 sectors by four I axes ($-I_0<->I_0$, $-I_1<->I_1$, $-I_2<->I_2$, $-I_3<->I_3$) and four Q axes that are perpendicular to the I axes ($-Q_0<->Q_0$, $-Q_1<->Q_1$, $-Q_2<->Q_2$, $-Q_3<->Q_3$). The baseband I and Q signals 221, 222 are components of a filtered received signal that can be modeled by a signal phasor, P, that rotates around the complex plane as the signal is received at an instantaneous rate and a direction determined by the data symbol pattern being received. In accordance with the preferred embodiment of the present invention, a four level frequency modulation is used with the four levels being nominally at frequencies of −4800 Hz, −1600 Hz, +1600 Hz, and +4800 Hz, and the phasor rotates counter-clockwise at a rate of 4800 Hz when the modulation is +4800 Hz.

Referring to FIG. 4, an electrical block diagram of the phase shifter and limiter 320 of the phase quantizer is shown, in accordance with the preferred embodiment of the present invention. For purposes of describing the operation of the phase shifter and limiter 320, the values of the I and Q signals 221, 222 at any given time for a signal phasor that is at an angle α relative to the $-I_0<->I_0$ axis are identified herein as $i_0$ and $q_0$. The signal phasor can be further represented as having components on the remaining three sets of axes (wherein the sizes of the components are indicated by the dotted lines in FIG. 3 for the phasor P). The axes are offset from each other by π/8 (22.5 degrees). Using conventional trigonometric transformation formulas, the eight ($2^M/2$) components on the axes are related to the magnitude of the phasor P, which has a reference magnitude of one, and the angle of phasor P, which is identified as α, as follows:

$i_0 = \cos(\alpha)$ $q_0 = \sin(\alpha)$ $i_1 = \cos(\alpha)\cos(\pi/4) + \sin(\alpha)\sin(\pi/4)$ $q_1 = \sin(\alpha)\cos(\pi/4) - \cos(\alpha)\sin(\pi/4)$ $i_2 = \cos(\alpha)\cos(\pi/8) + \sin(\alpha)\sin(\pi/8)$ $q_2 = \sin(\alpha)\cos(\pi/8) - \cos(\alpha)\sin(\pi/8)$ $i_3 = \cos(\alpha)\cos(3\pi/8) + \sin(\alpha)\sin(3\pi/8)$ $q_3 = \sin(\alpha)\cos(3\pi/8) - \cos(\alpha)\sin(3\pi/8)$ By determining only the polarities, or signum, of each of these 8 components for the phasor P at any angle α, a determination can be made as to which of the N (16) sectors of the phase plane the phasor lies within. The set of polarities of the $2^M/2$ (eight) components for any given angle are herein called a binary position word. The values of the binary position word are shown in the column labeled "Position Word" of Table 1, with a 0 indicating a negative polarity and a 1 indicating a positive polarity. Each of the 16 sectors is given a sector name that is shown in the second column of Table 1 and also in FIG. 3.

TABLE 1

| Between Angles | | Sector Name | Position Word | Grey Scale Word | Two's Complement |
|---|---|---|---|---|---|
| Lower | Upper | | $i_0q_0i_1q_1i_2q_2i_3q_3$ | $g_3g_2g_1g_0$ | $t_3t_2t_1t_0$ |
| 7π/8 | π | W7 | 01010101 | 0100 | 0111 |
| 3π/4 | 7π/8 | W6 | 01010111 | 0101 | 0110 |
| 5π/8 | 3π/4 | W5 | 01110111 | 0111 | 0101 |
| π/2 | 5π/8 | W4 | 01111111 | 0110 | 0100 |
| 3π/8 | π/2 | W3 | 11111111 | 0010 | 0011 |
| π/4 | 3π/8 | W2 | 11111110 | 0011 | 0010 |
| π/8 | π/4 | W1 | 11101110 | 0001 | 0001 |
| 0 | π/8 | W0 | 11101010 | 0000 | 0000 |
| 15π/8 | 2π | W-1 | 10101010 | 1000 | 1111 |
| 7π/4 | 15π/8 | W-2 | 10101000 | 1001 | 1110 |

TABLE 1-continued

| Between Angles | | Sector Name | Position Word | Grey Scale Word | Two's Complement |
|---|---|---|---|---|---|
| 13π/8 | 7π/4 | W-3 | 10001000 | 1011 | 1101 |
| 3π/2 | 13π/8 | W-4 | 10000000 | 1010 | 1100 |
| 11π/8 | 3π/2 | W-5 | 00000000 | 1110 | 1011 |
| 5π/4 | 11π/8 | W-6 | 00000001 | 1111 | 1010 |
| 9π/8 | 5π/4 | W-7 | 00010001 | 1100 | 1000 |
| π | 9π/8 | W-8 | 00010101 | 1100 | 1000 |

Substituting the relationships $i_0=\cos(\alpha)$ and $q_0=\sin(\alpha)$, into the above equations, the following relationships result:

$i_0=i_0$ $q_0=q_0$ $i_1=i_0\cos(\pi/4)+q_0\sin(\pi/4)$ $q_1=q_0\cos(\pi/4)-i_0\sin(\pi/4)$ $i_2=i_0\cos(\pi/8)+q_0\sin(\pi/8)$ $q_2=q_0\cos(\pi/8)-i_0\sin(\pi/8)$ $i_3=i_0\cos(3\pi/8)+q_0\sin(3\pi/8)$ $q_3=q_0\cos(3\pi/8)-i_0\sin(3\pi/8)$ These relationships are implemented by the phase shifter and limiter 320, which further converts the resulting analog values of $i_0 q_0 i_1 q_1 i_2 q_2 i_3 q_3$ to binary values representing the signum of each of the values. More specifically, the continuously varying values of the I and Q signals 221, 222, $i_0$ and $q_0$, are each coupled to one of two limiters 410 and to each of six linear and signum function blocks 415. Each of the two limiters 410 converts the analog value of the $i_0$ and $q_0$ signal to a binary value which represents the signum (positive or negative state) of the analog value. Two of the six linear and signum function blocks, which implement the relationships given above for $i_0$ and $q_0$, are shown in detail at the bottom of FIG. 4. The linear and signum function blocks 415 consists essentially of conventional analog summing circuits 450, analog scaling circuits 455, and reference source circuits 457 which collectively implement the above Boolean relationships, and limiters 410 that generate the signum output for each component. The analog summing circuits 450, analog scaling circuits 455, and reference source circuits 457, are preferably implemented using (electrical) current operational amplifiers and (electrical) current reference circuits, but can alternatively be implemented using voltage operational amplifiers and voltage reference circuits. The set of 8 SGN values 475 of the components $i_0 q_0 i_1 q_1 i_2 q_2 i_3 q_3$ forms the binary position word, which changes as the phase angle of the received signal changes, asynchronously with respect to internal clocks of the communication receiver 100.

Referring to FIG. 5, an electrical block diagram of the Grey scale encoder and latch 380 is shown, in accordance with the preferred embodiment of the present invention. The Grey scale encoder and latch 380 comprises a Grey scale encoder 510 and a latch 520. The Grey scale encoder 510 consists essentially of 4 EXCLUSIVE-OR logic gates 525 and 3 logic INVERTERS 530 that are coupled as shown in FIG. 5 in a conventional manner to implement the following relationships for the M bits of the Grey coded position word:

$g_3$=NOT (SGN($q_0$))

$g_2$=NOT (SGN($i_0$))

$g_1$=NOT ((SGN($i_1$) XOR SGN($q_1$))

$g_0$=((SGN($i_2$) XOR SGN($q_2$)) XOR (SGN($i_2$) XOR SGN ($q_2$)))

In the above relationships, XOR indicates the Boolean Exclusive Or function, and SGN indicates the signum function performed by the limiters 410. The resulting set of values for $g_3 g_2 g_1 g_0$, which are identified herein as the Grey coded position words, are shown in the fifth column of Table 1. It will be appreciated that the values of the binary position word and Grey coded position word each change by only one bit at a time as the phasor rotates one sector (i.e., as the phase of the received signal changes). Logic gate configurations other than the one shown in FIG. 5 can be used to accomplish the same logic output, but with more transitions.

The Grey coded position word is coupled to the latch 520, wherein it is latched at the beginning of each period of the sample clock 190, which preferably operates at a rate of 38.4 kHz, thereby generating a clocked Grey coded position word 381, $cg_3 cg_2 cg_1 cg_0$. The unique implementation of the digital phase quantizer 310, in which the binary position word and Grey coded position word only change by one bit at a time as the phase of the received signal increases from sector to sector, minimizes the impact of logic race conditions and logic setup time problems before the values are latched with the sample clock 190, and minimizes power consumption and increases noise immunity. It will therefore be appreciated that phase shifter and limiter conversion circuits other than the phase shifter and limiter conversion circuit 320, that implement other conversion formulas, could be used to produce the binary position words of bit width $2^M/2$, and that circuits other than the Grey scale encoder 510 could be used to convert the binary position words to M bit wide coded position words. The benefits of the present invention would be essentially provided, except that the signaling sensitivity could be degraded.

Figure 6:
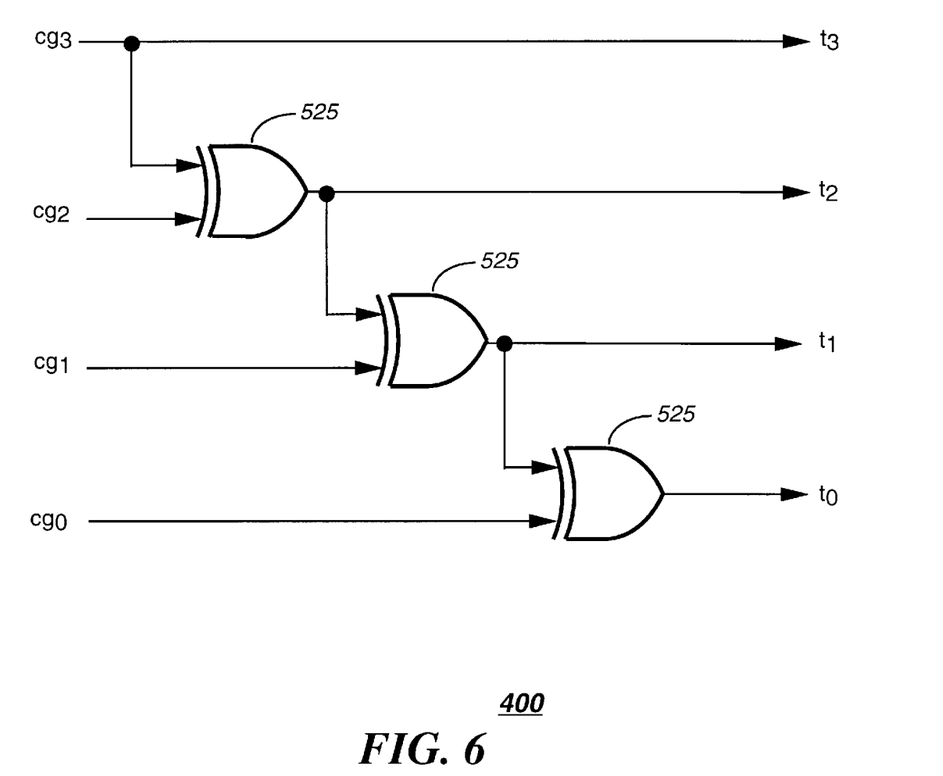
FIG. 6 is an electrical schematic diagram of a two's complement converter of the digital phase quantized FM detector, in accordance with the preferred embodiment of the present invention.

Referring to FIG. 6, an electrical block diagram of the two's complement converter 400 is shown, in accordance with the preferred embodiment of the present invention. As mentioned above, the two's complement converter 400 translates the 4-bit clocked Grey coded position word 381 $cg_3 cg_2 cg_1 cg_0$ into a two's complement position word $t_3 t_2 t_1 t_0$, which has a sign bit, $t_3$, and magnitude format $t_2 t_1 t_0$. The two's complement converter 400 consists essentially of three EXCLUSIVE-OR gates 525, which are coupled in a conventional manner to implement the following relationships:

$t_3=cg_3$ $t_2=cg_3$ XOR $g_2$ $t_1=cg_1$ XOR $t_2$ $t_0=cg_0$ XOR $t_1$

The two's complement position words $t_3 t_2 t_1 t_0$, for each sector are shown in the sixth column of Table 1. Logic gate configurations other than the one shown in FIG. 6 can be used to accomplish the same logical output.

Referring back to FIG. 1, the differentiator 420 is described in greater detail. The differentiator 420 comprises an M bit wide delay element 422 and an adder 424 that perform what is described herein as two's complement modulo N differentiation. The delay element 422 is a conventional M bit wide register providing one sample clock period of delay and the adder 424 is a conventional M bit wide two's complement adder that adds modulo $2^{M-1}$. The input to the differentiator 420 is the output from the two's complement converter 400, the two's complement position words $t_3 t_2 t_1 t_0$, which is coupled to both the delay element 422 and the adder 424. The delay element 422 and adder 424 are synchronized to the sample clock 190. During each clock period the adder 424 receives a first two's complement position word associated with the period of the sample clock 190, and the delay element 422 stores a second two's complement word associated with an immediately preceding period of the sample clock 190 and couples the second two's complement word to the adder 424, the adder 424 subtracting the second two's complement word from the first two's complement word and generating at an output a two's complement difference word. Thus the output of the adder 424 is a value that indicates the number of sectors the phasor has traversed and the direction of phasor traversal, which represents a change of the phase angle in magnitude and direction during each period of the sample clock 190. That information is the number of sectors by which the FM signal phasor moved and the direction in which the FM signal phasor has moved during a period of the sample clock 190. The output of the differentiator 420 is an M bit wide two's complement difference word, which in this case is a four bit difference word, $d_3d_2d_1d_0$.

For example, suppose that the FM signal phasor traverses from sector W4 to sector W6 in one sample clock period. The output of the adder 424 is 6−4=2. Now suppose the FM signal phasor traverses from sector W−8 to sector W7 during one sample clock period. The output of the adder 424 is 7−(−8)=−1 in two's complement form ($d_3d_2d_1d_0$=1111), which conforms to the diagram shown in FIG. 3 because sector W7 and W−8 are defined to be adjacent to each other and the phasor is moving clockwise. It is established as convention that movement of the FM vector in the counter-clockwise direction is positive and movement in the clockwise direction is negative. It will be appreciated, that by restricting the two's complement adder to be an M bit wide two's complement adder, additional logic manipulations are not needed to accommodate transitions between the positive valued and the negative valued sectors, thus minimizing the required circuitry.

Figure 7:
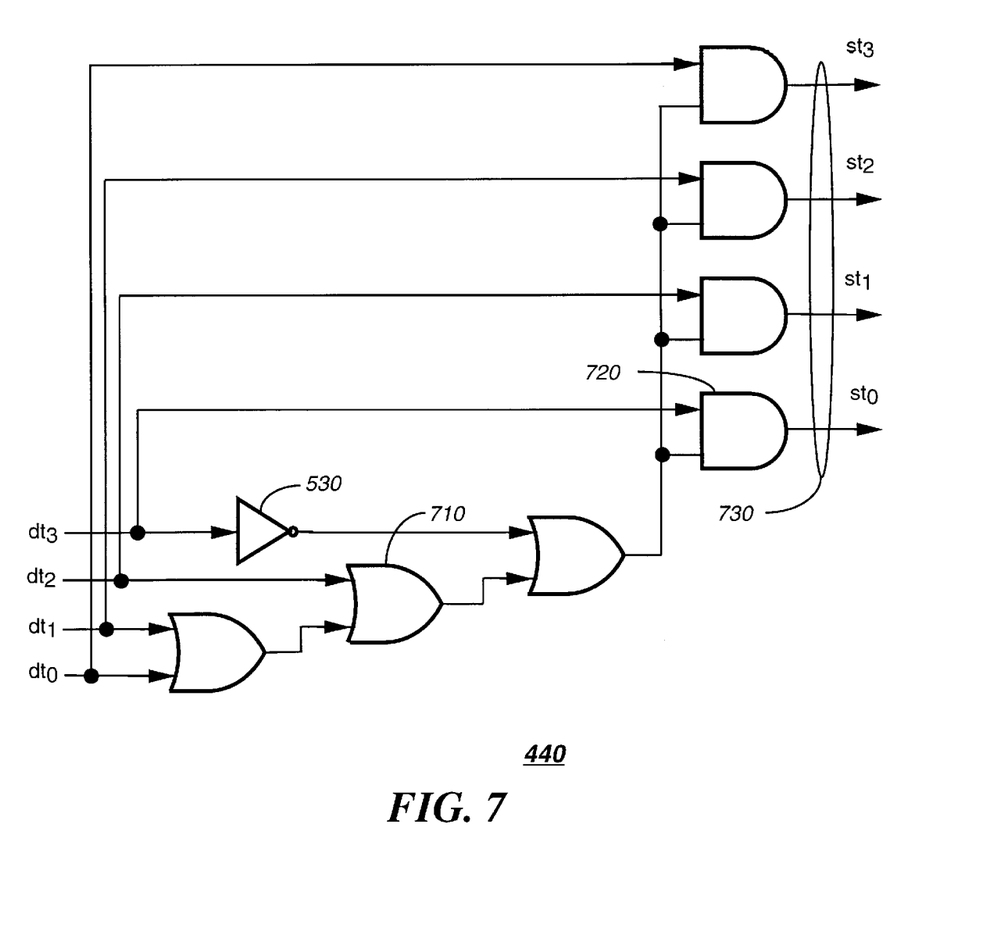
FIG. 7 is an electrical schematic diagram of a symmetry adjust circuit of the digital phase quantized FM detector, in accordance with the preferred embodiment of the present invention.

Referring to FIG. 7, an electrical block diagram of the symmetry adjuster 440 is shown, in accordance with the preferred embodiment of the present invention. The input to the symmetry adjuster circuit 440 is the two's complement difference word, $d_3d_2d_1d_0$. The symmetry adjuster circuit 440 passes all values of $d_3d_2d_1d_0$ without alteration, except for the value −8 ($d_3d_2d_1d_0$=1000), which it translates into a two's complement zero($d_3d_2d_1d_0$=0000), because the two's complement difference word is not symmetric about zero (for any value of M). The symmetry adjuster circuit 440 preferably comprises three two input OR gates, four two input AND gates, and an INVERTER 530 coupled as shown in FIG. 7. Logic gate configurations other than the one shown in FIG. 7 can be used to accomplish the same result. The output of the symmetry adjuster circuit 440 is a 4 bit wide, symmetrical difference word 730, $st_3st_2st_1st_0$, which has a value determined by the number of sectors the phasor has traversed in one sample clock period represents a phase angle change during a period of the sample clock 190. This alteration to the output values of the differentiator 420 generates the symmetrical difference words 730 such that their steady state values for equivalent positive and negative received frequency deviations (i.e., frequencies of the received data symbols) are equal and centered about zero. In other words, an output curve plotted on a graph showing the symmetry adjusted PDF output values versus deviation frequency is centered about zero deviation frequency. It will be appreciated that when an automatic frequency control (AFC) circuit is coupled to the digitized demodulated signal 461 and used to adjust a local oscillator that is coupled to the mixers 160, 180, the use of such symmetrical difference words 730 improves the performance of the AFC circuit and results in a smaller average offset of the recovered deviation than would result without the symmetry adjuster circuit 440. Therefore performance reliability of recovery of the received data symbols is improved.

Figure 8:
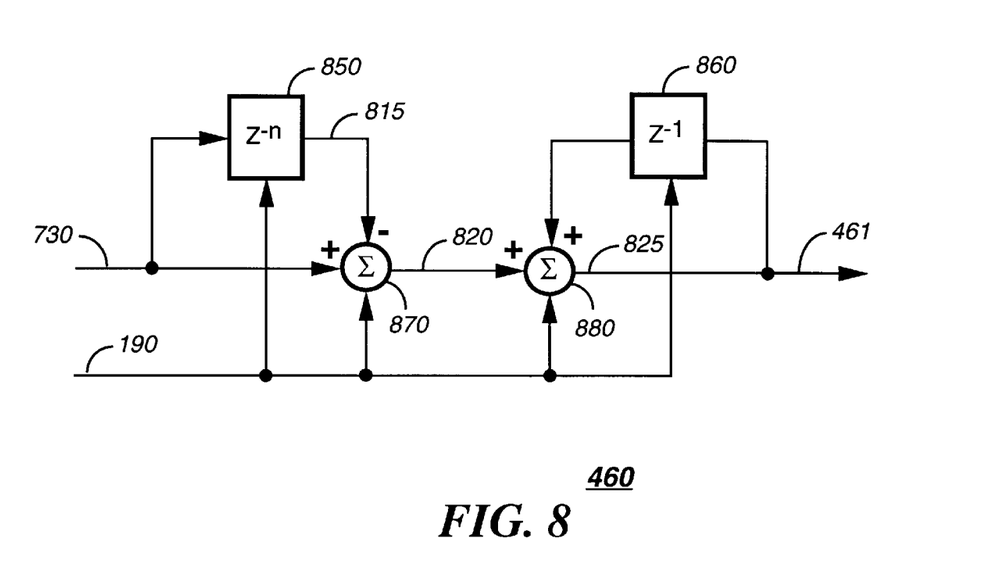
FIG. 8 is an electrical schematic diagram of a post detection finite impulse response (FIR) filter of the digital phase quantized FM detector, in accordance with the preferred embodiment of the present invention.

FIG. 8 illustrates the PDF 460 in greater detail. The PDF 460 comprises two delay elements 850, 860 and two adders 870, 880. The delay element 850 is an M bit wide variable tapped delay element of conventional design that is clocked by the sample clock 190, and is tapped at a delay of S periods of the sample clock. The value S is set by the microprocessor 260. In accordance with the preferred embodiment of the present invention, S is chosen as a number of periods of the sample clock that represent approximately 80% of a duration of a symbol period of the signal currently being received. For example, in accordance with the preferred embodiment of the present invention, the possible symbol rates are 1600 symbols per second (sps) and 3200 sps, and the sample clock rate is 38,400 Hz, so S is set to 10 for 3200 sps and 19 for 1600 sps. With these values of tapped delay, S, the PDF 460 forms a "box car" filter optimized for symbol recovery when the received signal is distorted by the type of interference found in simulcast communication systems, which is characterized by higher distortion of the symbol transitions than other types of distortion. The value of S can be chosen differently when the detector 300 is used in communication systems wherein the distortion is largely of another type. For example, when the received distortion is expected to be typically pure noise, such as encountered in space communication systems, the value of S would preferably be set to represent more than 80% of a duration of a symbol period. The value of S is preferably not set to represent less than 50% of a duration of a symbol period. The symmetrical difference word 730, $st_3st_2st_1st_0$, is coupled to the delay element 850 and to a positive input of the adder 870. The tapped output of the delay element 850 is coupled to a negative input of the adder 870. The adder 870 is a conventional M+1 bit wide two's complement adder. Designing the adder 870 to be M+1 bits wide assures that all sums generated by the adder 870 will be within the modulo limit of the adder 870.

The adder 880 and delay element 860 form an integrator. The output of the adder 870, which is coupled to a positive input of the adder 880, which is a two's complement adder of width R. The output of the adder 880 is the digitized demodulated signal 461 of the detector 300, and is coupled to the delay element 860 which is a conventional single delay element of bit width R coupled to the sample clock 190. The output of the delay element 860 is coupled to a positive input of the adder 880. R is chosen such that the greatest sum the adder 880 produces is within the modulo limit of the adder 880. The greatest sum is determined by multiplying the maximum value of S by the maximum value of the symmetric difference words 730. For example, in accordance with the preferred embodiment of the present invention, the detector 300 is designed to detect symbol frequencies of up to ±9600 Hz (allowing for net offsets of the recovered modulation of up to ±4800 Hz). The average magnitude of the symmetric difference words 730 is determined by the formula (DF×N)/SCR, wherein DF is the average frequency currently being detected and SCR is the sample clock rate. In the case of the preferred embodiment of the present invention, in which DF can be up to 9600 Hz and SCR=38,400 Hz, the maximum value of the symmetrical difference words 730 is ±4. S is maximum (19) when the symbol rate is 1600 Hz, so the maximum output magnitude for the adder 880 is 19×4, or 76. Thus, the bit width R must be chosen as 8, in which case adder 880 is capable of generating numbers as large as ±127.

The digitized demodulated signal 461 is coupled to the bit slicer 480. The bit slicer is controlled by the controller 250 to asynchronously generate level identifying bits that identify one of the possible values of the multilevel symbols that has been recovered by the detector 300, by controlling a selection of predetermined bit slice values. The use of predetermined bit slice levels is possible in the present invention because, unlike prior art analog detectors, the gain of the detector 300 is fixed for each predetermined modulation scheme which it is designed to recover. For example, in accordance with the preferred embodiment of the present invention, a four level signal can be received having one symbol rate of 3200 Hz and having a transmitted deviation of one of four values, ±1600 Hz and ±4800 Hz. As described above, S is set at 10 for a symbol rate of 3200 Hz. The maximum value of the symmetrical difference words 730 is ±2. Thus, the digitized demodulated signal 461 varies between ±20. To receive this type of modulation, the controller 250 sets bit slicing levels of the bit slicer 480 to values of zero and ±13, and generates the asynchronous MSB 481 as determined solely by a logical comparison of the value of the digitized demodulated signal 461 to the bit slice value of zero, and generates the asynchronous LSB 482 as determined by a logical comparison of the value of the digitized demodulated signal 461 to the three bit slice values of zero and +13, which is preferably done with conventional, unclocked logic gates intercoupled in a conventional manner. It will be appreciated that the bit slicer 480 can be designed with very few logic gates and that the bit slicer 480 provides the identification of the recovered symbols using a circuit that relieves the microprocessor 260 from performing this operation at the sample clock rate, thus reducing power drain.

It will be appreciated that the detector 300 can be used for demodulating FM signals other than radio signals, such as infra-red signals. Other modulation frequencies and symbol rates can be accommodated by altering the sample clock rate and the values of M, S, and R. The phase angle could be measured with respect to the Q signal instead of with respect to the I signal, using modifications obvious to one of ordinary skill in the art.

By now, it should be evident that the present invention demodulates multilevel FM modulation using circuit elements such as conventional current mode operational amplifier analog scalers and summing circuits, and conventional digital logic such as EXCLUSIVE OR gates, inverters, registers and adders that can be integrated in small areas. Because the circuit functions in the present invention are continuously running, without a need for being reset or synchronized to the symbol rate, and because they avoid complex algorithmic techniques, the detector 300 can be easily implemented without a microprocessor in an integrated circuit that is small and requires little power to operate. The detector 300 can be integrated into one integrated circuit that includes the entire receiver section 150. The present invention has a fixed gain that is set by the sampling rate of the sample clock and the number of sectors, and therefore the threshold values used by the bit slicer can be designed into the integrated circuit for a given modulation scheme (such as the FLEX™ protocol, licensed by Motorola, Inc. of Schaumburg, Ill.). The linear phase of the post detection filter and the use of digital circuitry help to limit the phase and amplitude distortion which impacts typical analog demodulators, and improves performance in a simulcast environment.

We claim:

1. A digital phase quantized frequency modulation (FM) detector for a communication receiver, comprising:

a digital phase FM quantizer for receiving as input I and Q signals derived from a received RF signal, the digital phase quantizer generating at the beginning of each period of a sample clock one of a sequence of coded position words of width M bits each of which identifies a sector location of a phasor representing the I and Q signals for each period;

a two's complement converter, coupled to the digital phase FM quantizer, for receiving the coded position words and converting each of the coded position words into a two's complement position word of width M bits;

a differentiator of width M bits, coupled to the two's complement converter, for receiving two consecutive two's complement position words and generating a two's complement difference word which represents a change of a phase angle of the phasor in magnitude and direction during each period of the sample clock; and a digital post detection filter coupled to the differentiator for filtering consecutive two's complement difference words and generating therefrom a reconstructed digital audio signal, wherein M is a positive integer.

2. The digital phase quantized FM detector according to claim 1, wherein the digital phase FM quantizer generates each of the coded position words to be a Grey coded word.

3. The digital phase quantized FM detector according to claim 1, wherein the digital phase FM quantizer comprises:

a phase shifter and limiter for receiving the I and Q signals and generating a sequence of binary position words of width $2^M/2$, each of which identifies the sector location of the phasor of the I and Q signals for each period;

an encoder coupled to the phase shifter and limiter for encoding each binary position word to generate each coded position word; and a latch coupled to the encoder and to the sample clock signal to latch each coded position word during each period of the sample clock.

4. The digital phase quantized FM detector according to claim 3, wherein the encoder generates each coded position word to be a Grey coded word.

5. The digital phase quantized FM detector according to claim 3, wherein each binary position word generated by the phase shifter and limiter identifies one of a plurality of $2_M$ sectors that are non-overlapping phase angle ranges that equally divide 360 degrees.

6. The digital phase quantized FM detector according to claim 3, wherein each binary position word is generated such that binary position words identifying adjacent sectors differ by only one bit.

7. The digital phase quantized FM detector according to claim 3, wherein the phase shifter and limiter consists essentially of a plurality of analog scaling circuits, analog summing circuits, and $2^M/2$ limiters, and bits of the binary position word are generated at outputs of the $2^M/2$ limiters.

8. The digital phase quantized FM detector according to claim 1, further comprising a symmetry adjuster circuit coupled between the differentiator and the digital post detection filter for translating the two's complement difference word to a symmetrical two's complement position word.

9. The digital phase quantized FM detector according to claim 1, wherein the differentiator comprises an adder that is an M bit wide modulo $2^{M-1}$ adder and an M bit wide delay element coupled to the two's complement converter, wherein during each period of the sample clock the adder receives a first two's complement position word associated with the period of the sample clock, and the M bit wide delay element stores a second two's complement position word associated with an immediately preceding period of the sample clock and couples the second two's complement position word to the adder, the adder subtracting, module $2^{M-1}$, the second two's complement position word from the first two's complement position word and generating at an output the two's complement difference word.

10. The digital phase quantized FM detector according to claim 1, wherein the digital post detection filter comprises:

a filter comprising a tapped delay element and a first two's complement adder, wherein the tapped delay element has a bit width of M and provides a delay of S periods of the sample clock, and the first two's complement adder has a bit width of M+1; and an integrator comprising a second two's complement adder having a bit width of R and a delay element having a bit width of R and a delay of one period of the sample clock.

11. The digital phase quantized FM detector according to claim 10, wherein S is set to a number of periods of the sample clock that represent at least 50% of a duration of a symbol period of a signal currently being received.

12. The digital phase quantized FM detector according to claim 10, wherein S is set to a number of periods of the sample clock that represent approximately 80% of a duration of a symbol period of a signal currently being received.

13. The digital phase quantized FM detector according to claim 10, further comprising a bit slicer coupled to the PDF that consists essentially of non-clocked logic gates that converts the reconstructed digital audio signal to asynchronous level identifying bits that identify a recovered modulation level.

14. The digital phase quantized FM detector of claim 1 comprising a single integrated circuit.

15. A receiver section that comprises a digital phase quantized frequency modulation (FM) detector for a communication receiver, comprising:

a digital phase FM quantizer for receiving as input I and Q signals derived from a received RF signal, the digital phase quantizer generating at the beginning of each period of a sale clock one of a sequence of coded position words of width M bits each of which identifies a sector location of a phasor representing the I and Q signals for each period;

a two's complement converter, coupled to the digital phase FM quantizer, for receiving the coded position words and converting each of the coded position words into a two's complement position word of width M bits;

a differentiator of width M bits, coupled to the two's complement converter, for receiving two consecutive two's complement position words and generating a two's complement difference word which represents a change of a phase angle of the phasor in magnitude and direction during each period of the sample clock; and a digital post detection filter coupled to the differentiator for filtering consecutive two's complement difference words and generating therefrom a reconstructed digital audio signal, wherein M is a positive integer.

16. The receiver section according to claim 15 that comprises a single integrated circuit.

17. A communication radio that comprises a digital phase quantized frequency modulation (FM) detector for a communication receiver, comprising:

a digital phase FM quantizer for receiving as input I and Q signals derived from a received RF signal, the digital phase quantizer generating at the beginning of each period of a sample clock one of a sequence of coded position words of width M bits each of which identifies a sector location of a phasor representing the I and Q signals for each period;

a two's complement converter, coupled to the digital phase FM quantizer, for receiving the coded position words and converting each of the coded position words into a two's complement position word of width M bits;

a differentiator of width M bits, coupled to the two's complement converter, for receiving two consecutive two's complement position words and generating a two's complement difference word which represents a change of a phase angle of the phasor in magnitude and direction during each period of the sample clock; and a digital post detection filter coupled to the differentiator for filtering consecutive two's complement difference words and generating therefrom a reconstructed digital audio signal, wherein M is a positive integer.

\* \* \* \* \*